United States Patent [19]

Holmes et al.

[11] Patent Number: 5,687,373

[45] Date of Patent: Nov. 11, 1997

[54] COMMUNICATIONS SYSTEM FOR EXCHANGING DATA BETWEEN COMPUTERS IN A NETWORK AND A METHOD OF OPERATING SUCH A SYSTEM IN WHICH COMMUNICATIONS SERVICES ARE DEFINED WITHIN A COMMON OBJECT CLASS

[75] Inventors: Keith Thomas Holmes, Rathsarham, Ireland; Philip Hewitt, Ebinburgh, United Kingdom; Jonathan O'Connor, County Dublin, Ireland; Richard Thompson, Esbjerg, Denmark

[73] Assignee: International Business Machines Corporation, Armonk, N.Y.

[21] Appl. No.: 416,233

[22] Filed: Apr. 4, 1995

[30] Foreign Application Priority Data

Apr. 5, 1994 [GB] United Kingdom ............... 9406714

[51] Int. Cl.⁶ .................................................. G06F 13/00
[52] U.S. Cl. .................................................. 395/682
[58] Field of Search .................... 364/DIG. 1 MS File, 364/DIG. 2 MS File; 395/200.01, 200.05, 200.09, 200.12, 375, 500, 650, 700, 680, 682, 683, 684

[56] References Cited

U.S. PATENT DOCUMENTS 5,544,320  8/1996  Konrad ............................. 395/200.09
5,553,242  9/1996  Russell et al. ..................... 395/200.12

*Primary Examiner*—Robert B. Harrell
*Attorney, Agent, or Firm*—Joscelyn G. Cockburn

[57] ABSTRACT

A communications system and method, for facilitating exchange of data between a first computer and a second computer connected in a network to operate in a client/server arrangement: The first computer employing a different operating system to the second computer and the system having a basic communications application program interface (API). The system includes a first device for processing requests from a first application running on the first computer for connection with the second computer to carry out one of a plurality of communication services, second device for instructing a second application on the second computer to carry out the communications services and for returning data provided by the second application to the first computer and a storage device, on each computer accessible by the respective devices, storing a single object class for providing definitions for each of the plurality of communication services.

11 Claims, 2 Drawing Sheets

COMMUNICATIONS SYSTEM FOR EXCHANGING DATA BETWEEN COMPUTERS IN A NETWORK AND A METHOD OF OPERATING SUCH A SYSTEM IN WHICH COMMUNICATIONS SERVICES ARE DEFINED WITHIN A COMMON OBJECT CLASS

BACKGROUND OF THE INVENTION

1) Field of the Invention

The present invention relates to a communications system, and method of operation of such a system, for facilitating exchange of data between two or more computers connected in a network. In particular the communications system is based on a Client/Server model, and in a typical Client/Server model there will be periodic communication between an application program at a Client computer and a Server computer connected across the network. The Client computer will usually be close to the human user of the system and the Server computer will typically provide a variety of central services.

2) Prior Art

The client and server computer architectures are frequently heterogeneous in terms of the manner in which data is represented and tasks are managed. By its nature, the server computer operating system may also be very complex (eg IBM's MVS Operating System) and require deep knowledge of the system structure and facilities to operate with adequate performance and also with adequate reliability, availability and serviceability (commonly known as RAS), which are essential if the user at the client system is to be serviced adequately.

The communications system will provide the 'interface' between the Client computer and the Server computer, and a programmer writing the client application program will utilise this interface to communicate a wide range of basic requests and responses between the client and the server. On top of these basic requests, higher level requests related specifically to the client application may need to be implemented.

There are a variety of known techniques for establishing interfaces which facilitate, to a degree, cooperative processing between a client and server computer. These techniques depend to a greater or lesser extent on the underlying communications protocol, such as the APPC (or Lu6.2) or TCP/IP protocol.

One known programming interface is the basic Communications Interface, eg APPC. As will be known by the person skilled in the art, APPC gives an "Application Program Interface" (API) access into the large set of LU6.2 facilities, including architectural 'towers' for such things as the Distributed Data Model. Other communications protocols (eg TCP/IP) provide alternative facilities.

Although each Client application program can develop its own implementation on top of APPC, this results in a duplication of effort and education in a particularly complex area and makes full code reusability more difficult, since the boundaries of the use of the interface are not pre-defined.

An efficient implementation for the majority of client/server needs ought to be such that it avoids the need for the client application programmer to have a deep understanding of communications protocols such as Lu6.2.

Another known programming interface is provided by the Remote Procedure Call (RPC). With this facility, the client application programmer merely calls subroutines to access remote facilities such as a database, and the communication system takes care of recognising whether the subroutine is local or remote. In the remote case the call is packaged and sent on a link (eg. an LU6.2 link) to the remote system. Since the client application is unaware of this 'function-shipping' it waits until the call returns.

This RPC technique fails to be sufficiently flexible for the needs of today's powerful client/server systems. It does not possess the flexibility to enable other processing to be carried out before the reply is received, and can be complex to implement due to the need to maintain transparency of the link.

This type of interface is totally 'transparent', in that the programmer is completely unaware that communications to a remote computer are taking place; this is not ideal where it is desired that the client/server system should optimise its performance and usability. In such instances it is important that the client application programmer can choose the type of request (Remote Procedure Call, File Transfer, etc) in a non-transparent way, so that, when a server access is required, the programmer can make the best decision as to the type of request that will not impact the end-user unduly.

In Message Driven Processing techniques, the application interface (such as provided by IBM's 'MQSeries' range of products) provides full asynchronous, queued communication between distributed applications. Distributed applications are applications which reside partly on two or more computers, these parts needing to communicate with each other. The application interface provides comprehensive message delivery, which is suitable for Workflow Management, and complex recovery and integrity.

Other, simpler, methods of communication using messages between distributed applications also exist, particularly in the workstation only environment.

The more complex message driven processing techniques (such as the full MQSeries solution), are not appropriate and too 'expensive' for a tightly-coupled cooperative application. Such an application is one where the separate parts running on different computers know when they should talk and listen to one another. One example is a dedicated client/server communication system. Here the client asks the server a question and the server answers: the server never talks to the client unless a question is asked. In such applications there is no need for asynchronous queuing, since the client makes a request and the server services it straight away.

On the other hand, the simpler messaging methods are not readily available on host systems such as MVS, which are required for today's powerful client/server facilities (including unlimited access to host databases and performance).

Another known technique is commonly called 'Local API Emulation'. Various Cooperative programming Interfaces rely on emulating some or all of the 'local' API; this technique can be viewed as a type of enhanced RPC. For instance, IBM's 'AConnS' product provided cooperative functions by a distributed version of a subset of the OS/2 Presentation Manager Interface. An advantage over the standard RPC technique is that the programmer of the client application is explicitly aware that communication is in progress, and so can optimise his/her activities. However a disadvantage is that distribution of a complex local API can prove unwieldy, costly, and unnatural. Further, the API concepts that are distributed may be too broad or too far removed from the specific needs of Client/Server systems.

Nowadays many data processing systems have a message based environment in which 'object instances' are created and utilised by applications running on the system.

A message based environment is used by Object Oriented Programming (OOP) techniques, OOP being a particular approach to software development which implements required functions by way of 'messages' sent to 'objects'. An 'object' is a software component that contains a collection of related procedures (hereafter called 'methods') and data. Further objects can be grouped into 'Object Classes', an object class being a template for defining the methods and data for a particular type of object. All objects of a given class are identical in form and behaviour but have different data associated with them.

A 'message' is a signal sent to an object to request the object to carry out one of its methods. Hence a message sent to an object will cause a method to be invoked to implement the required function.

SUMMARY OF THE INVENTION

It is now becoming more common for OOP techniques to be applied in the programming interface area. In object-oriented design, the first task is to identify the 'domains'— such as the application (real world), the user interface, the system services, and possibly communications. It is difficult to clearly demarcate these.

The second task is to identify the classes (objects with their attributes and associated services) within each domain. The complexity of the resultant software is crucially dependent on this analysis.

Prior art systems that use objects to represent the communications facilities typically end up with a set of unrelated objects, driven by the need to reflect an existing API (eg APPC). As a result, the boundaries of the Communications Domain are usually not clearly identifiable. For example, a typical OOP system might implement the communications facilities such as "Start-Session", "Get-Buffers", "Send/Receive", "Error-Response", and "Data-Purge" as unrelated objects, which are very much tied to the application program that they were developed for. Hence it is difficult to re-use them.

In the Client/Server environment, there is a need for a programming interface between the client and the server to provide the major client/server facilities, for example allowing the local client application to call functions, manipulate files, transfer data and conduct conversational communications with remote server platforms, without exposure of the client application to the communications architecture or communications API.

Advantageously this should operate in such a way that it can be optimised for Client/Server, take advantage of complex high-power host systems, and support heterogeneous data representations, etc. between client and server.

Further the communications system embodying the interface should, in preferred embodiments, be reusable for other varieties of Client/Server, and extendible, for example, to other server platforms.

Accordingly the present invention provides a communications system for facilitating exchange of data between a first computer and a second computer connected in a network to operate in a client/server arrangement, the first computer employing a different operating system to the second computer, and the system having a basic communications application program interface (API), the system being characterised by: first logic means for processing requests from a first application running on the first computer for connection with the second computer to carry out one of a plurality of communication services; second logic means for instructing a second application on the second computer to carry out the communications services and for returning data provided by the second application to the first computer; and a storage device on each computer accessible by the respective logic means, each storage device storing a single object class for providing definitions for each of the plurality of communication services.

In preferred embodiments each storage device stores a cohesive framework of object classes derived from the single object class. Further the communications services defined by the framework of object classes typically facilitate function calling, file manipulation, and data transfer.

In the preferred embodiment of the communications system, the operating system employed by the first computer is the IBM OS/2 operating system. Further the operating system employed by the second computer is the IBM MVS operating system. With such an arrangement, the basic communications API can be APPC.

Viewed from a second aspect, the present invention provides a method of operating a communication system to facilitate exchange of data between a first computer and a second computer connected in a network to operate in a client/server arrangement, the first computer employing a different operating system to the second computer, and the system having a basic communications application program interface (API), the method being characterised by the steps of: employing a first logic means to process requests from a first application running on the first computer for connection with the second computer to carry out one of a plurality of communication services; employing a second logic means to instruct a second application on the second computer to carry out the communications services; returning data provided by the second application via the second logic means to the first computer; and storing in each computer in a storage region accessible by the respective logic means a single object class for providing definitions for each of the plurality of communication services.

The invention resides in time realisation that the different communication services can be represented by a single 'Object Class', this approach giving rise to a number of significant improvements in client/server communications. By proposing that 'Communications' (Client<. . . >Server) can 'itself' be represented as a CLASS, the communications domain (the services of the class and its derived classes) can be clearly defined.

The technique of the present invention, unlike any of the prior art techniques described above, provides a definitive, reusable, set of client/server facilities within the API itself.

Normally, the problem when providing 'generic' services is that it is not readily possible to optimise for specific environments and also allow easy change or enhancement of the functionality for specific application needs.

Clearly code which operates in the Communications Domain can always be written in an object-oriented manner (since any code can in theory be written in an object-oriented manner), but it is the crux of this invention that, by representing the essential set of Client/Server communication facilities as a single C++ Object Class themselves, a flexible and simple interface can be constructed. In other words, the invention encapsulates a new technique for establishing an extremely usable cooperative interface for client/server applications.

This technique arises from the idea of regarding the client/server cooperative needs as attributes of a class, in combination with the utilisation of object-oriented concepts (eg class derivation allows easy changes and extensions to the base functions, so that the interface is tailored to the specific requirements of the system).

By representing the services of RPC, File Transfer, Data Conversion, Send/Receive, etc as class services, communications is no more complex than a normal function call, but is extendible and optimisable without affecting its fundamental nature; the class can be extended or sub-classed without affecting any existing uses. Further, it is eminently reusable, as new classes can be derived for new client/server applications.

The present invention will be described further, by way of example only, with reference to a preferred embodiment of the invention as illustrated in the accompanying drawing.

DESCRIPTION OF THE PREFERRED EMBODIMENT

Figure 1:
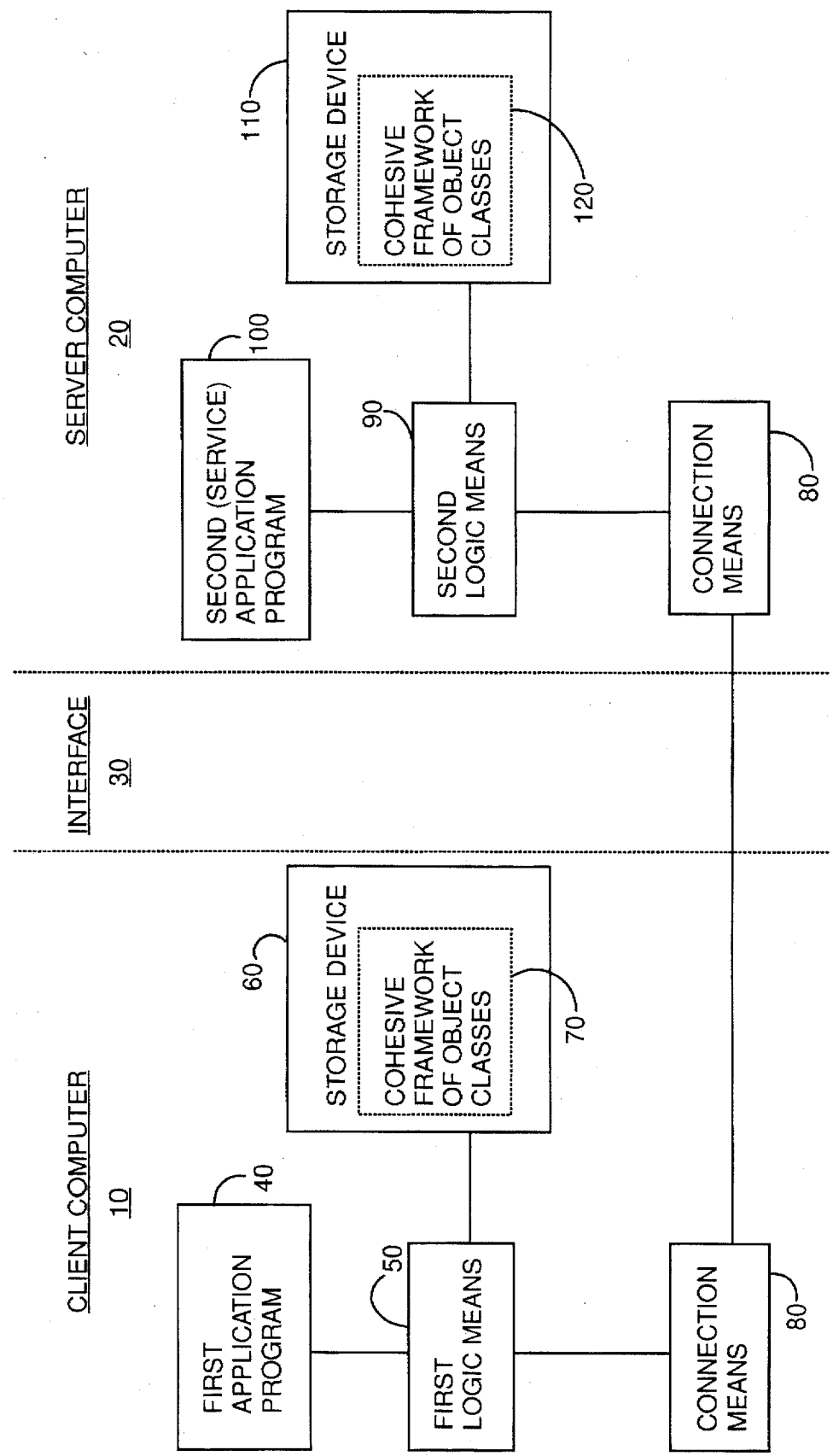
FIG. 1 is a block diagram illustrating the communications system of the preferred embodiment of the present invention.

In the preferred embodiment of the present invention, we will consider a communications system that is based on a typical client/server model. The client computer will typically employ an operating system such as IBM's OS/2 operating system, and the server computer will employ a host-based operating system such as IBM's MVS operating system (IBM, OS/2 and MVS are Trade Marks of International Business Machines Corporation).

The problem in constructing a communications system can generally be separated into specific areas. In order to do this one must firstly consider the specific functional requirements of the communications system in question. For instance, a number of specific functional requirements for the communications system may be:

RPC: Essentially, the communications system will invoke a procedure on the Host Server, at the request of the Client. Although the initial number of possible procedures may be relatively small, this facility should be easily extensible for adding new procedures in the future.

Data Conversion: The communications system may have a large number of complex control blocks, consisting of mixed data types, to be exchanged between the Client and the Host Server. These will have to converted into the appropriate platform formats, and may have to accommodate DBCS (Double Byte Character Set) data, such as Kanji.

Buffer Management: There will be arbitrarily sized amounts of data returned from the Server, and the amount of data to be returned is not known in advance. It may be large, in excess of the send buffer limit (the send buffer is the storage area for data being sent on the link).

File Management: Download and upload of files including sequential & PDS (Partitioned Data Set) members may be required. There are other potential requirements such as delete, print, copy, etc.

Transparent Operation: For the usability goals of the communications system, the communications aspects should be 'unseen'. The need for user initiated start-up and termination is to be avoided, Flexibility: As the communications system may be usable on widely differing system configurations, the significant performance factors may vary considerably. It should be easy to amend the key performance parameters to accommodate this. However, it should also provide a default configuration for ease of use.

Environment: In the preferred embodiment of the present invention the communications system requires the above functionality between an OS/2 client and MVS server using APPC communications.

These requirements give rise to a number of separate problems. For instance one problem is in Performance & Resource Use—the User driven, multi-threaded nature of OS/2 in particular presents a number of problems for Client/Server to MVS, for example:

1. Concurrency: Concurrent Server activities are needed to handle concurrent front end activities if response time is to be acceptable. This is especially difficult with an MVS server;
2. Session Control: Unpredictable user activity sequence cannot determine how long to keep communications sessions active. Frequent stopping & starting of sessions carries a heavy performance overhead;
3. Resource Use: Unless attempts are made to maximise the effective use of resources such as OS/2 processes, MVS address spaces & APPC conversations, concurrent activity on the workstation could cause heavy use of the various network and platform resources. This translates into high cost and less overall processing capability; and
4. Resource Sharing: Unless attempts are made to manage the use of resources, heavy activity by one user could adversely affect the resources available to other users, and thus impact on their application's performance. Ideally, heavy activity by one user should only impact their own performance.

A second problem that arises is in the area of Software Reuse & Extensibility. The functionality developed for the communications system should be easy to use, re-use, and extend. This is to accommodate the following potential uses:
1. Future extensions to the communications system, such as additional functionality and new platforms (eg. VM); and
2. Re-use of the communications system as a 'building block' for other products.

These problems have been overcome in the preferred embodiment of the present invention by constructing a single, cohesive and unified 'product', which provides the required communications requirements as to functionality and performance, as well as being easily extendable and tailorable. This product is referred to hereafter as the Client/Server Application Enabler (CSAE). Its characteristics are:
1. It provides services to a client application to allow the client application to call functions, manipulate files, transfer data and conduct conversational communications with remote platforms, without exposure of the client application to the communications architecture or communications API.
2. It presents these services as a cohesive framework of C++ classes, derivable from a single C++ Class, rather than API functions, as this allows derivation of functionality for specific needs.
3. It provides a standard set of functions and a standard interface, regardless of the communications protocol or remote platform environment.
4. It internally implements platform/protocol specific features to maximise performance and minimise resource usage.
5. It operates in an automatic, transparent manner to the user or using application. There is no need for the user to perform any action to establish a communications 'session', or to activate the CSAE component.

The main significance of these features is that a standard service and interface is provided across different communications protocols and operating environments, while optimising for each environment and allowing easy extensions to the provided services for specific needs. Normally, the problem when providing 'generic' services is that you lose the ability to optimise for specific environments or to change/enhance the functionality for specific application needs.

The main use of the CSAE, as its name suggests, is to facilitate implementation of Client/Server applications. In the preferred embodiment, it is directed to OS/2 as the client and MVS as the server, using APPC communications. This is probably the most complex environment to optimise for. As a result, certain features are highlighted below as an example of the optimisation and functional tailoring that is possible. It is important to keep in mind that the CSAE can be implemented for any platform.

Functionality

Remote Procedure Call (RPC): The CSAE provides a standard RPC mechanism. The client application provides the CSAE with the name of the remote function and a list of input and output parameters. The CSAE establishes the necessary communications, invokes the remote procedure and takes care of providing its input parameters and returning the output parameters. Note that the remote procedure is invoked through the standard mechanism for its environment. It does not know that it is being invoked 'remotely'. This means that existing functions can be used; they do not have to be specially written.

The MVS server can invoke the remote procedure as a batch job, or as a sub-task of the Server CSAE component. As a sub task, the procedure can be either a statically linked module, or an independent load module. Note that even if started as a batch job, the remote procedure can communicate with the client.

Data Conversion: The CSAE provides parameter data types as C++ classes known as RemoteParm classes (described in detail later), which handle all data conversion, and allow arbitrarily complex data structures to be built, ie. arrays and structures, nested to any depth. These classes accommodate DBCS data if operating under DBCS OS/2, and may accommodate the following basic data types (new ones can readily be added):

Fixed length character strings.

Variable length character strings (any size)

Unsigned short integers (2 bytes).

Unsigned long integers (4 bytes).

8 bit binary variables (bit strings, flags, etc)

16 bit binary variables.

The following composite data types are supported:

Structures.

Arrays (no pre-set size limit).

Buffer Management: The CSAE handles allocation of memory for data buffers, both for sending data and returning data. The using application has no knowledge of the buffer sizes unless this information is requested. The data is packed into and extracted from the buffers by the RemoteParms. The interface between the CSAE and the application deals only with RemoteParms. There is no size limitation on the size of a RemoteParm object—if it exceeds the transmission buffer size it is transmitted in multiple sends. Note that the size of an array received by the client from the server has no pre-set size limit. Elements will be added to the array as necessary.

File Management: Download and upload of files is provided. A remote file can be downloaded to a local file, or just held in memory for browse/update. Data to be written to a remote file may be taken from a local file or memory. Both local and remote files can be created, extended, overwritten or deleted. Note that files with complex record structures, such as a mixture of character and binary data, repeating groups, DBCS, etc, can be transmitted, and will be converted as necessary between the local and remote formats.

For MVS, PS (Physical sequential) datasets and PDS members can be sent/received.

Transparent Operation: The CSAE communications functions are contained in a Dynamic Link Library (DLL) that 'starts' when the first application requests these services, and 'stops' when the last application terminates. This not only provides these services in a transparent fashion, but also avoids repeating the start-up overhead for the subsequent requests. By stopping as soon as no longer needed, resources are released as soon as possible.

Flexibility: The CSAE provides timing and performance parameters that can be varied at run time for each using application, or even for different functions within one application. Defaults are provided.

As regards the problem of 'Performance & Resource Use' (Currently OS/2 to MVS), the following features are provided:

Concurrency: Concurrent requests are accommodated up to the configured maximum permissible number of SNA sessions. Concurrency occurs on the PWS Client by having multiple applications, and/or multiple processes and threads within one application, request communications to a specific MVS server. All these requests are directed to a single client process, which manages the actual communications. On the MVS Server, two techniques are used:

by attaching sub-tasks to the MVS Server CSAE address space, multiple requests can be handled by one MVS APPC address space; and by starting a batch job, for instance where the remote procedure needs a different 'environment' than that of the MVS Server CSAE component (eg. STEPLIB, SYSUDUMP, etc). This offloads processing to a batch region instead of the more 'expensive' APPC region. Note that this also limits the impact of one user to one APPC address space (scheduler).

Session Control: The PWS CSAE contains management functions that determine when to best allocate and deallocate conversations. This allows for resource sharing and re-use where applicable. This allows these resources to be kept active if still needed, and cuts down on stopping and starting of conversations, sessions, and the consequent scheduling of the Partner Object (this is described later).

Resource Use: The aforementioned management of sessions and conversations, and the use of sub-tasks and batch regions makes maximum use of resources.

Resource Sharing: The fact that one user can only schedule on APPC address space prevents one user from monopolising these resources.

As regards the problem of 'Software Reuse & Extensibility', the following features are provided:

Simplicity: The CSAE offers very straightforward functions such as RPC, Send and Receive. This makes communications no more complex from the programming perspective than issuing a normal function call. The underlying communications interface (ie. CPI-C/APPC) is not exposed. Functionally Extendable: The fact that the CSAE is a class means that it can be derived to allow changes and extensions to its base functions. The communications system itself uses this concept by deriving a class to provide certain enhanced file management functions.

Environmentally Extendable: Although the preferred embodiment of CSAE only accommodates OS/2 client and MVS server, all the partner specific code in the PWS CSAE is contained in a separate module. The CSAE can be easily extended to access other server platforms by providing other platform specific modules, and the generic CSAE code can accept future modules.

The above described communications system of the preferred embodiment will now be illustrated further with reference to FIG. 1. The client computer 10 has the IBM OS/2 operating system installed thereon, and an application program 40 runs on that operating system. The application program will periodically require communications services to be performed on the server computer 20 and/or data to be returned from the server 20 for subsequent use by the application program 40. For the purposes of the present invention it is irrelevant whether the requests for communications services to be carried out by the server are instigated by user interaction with the first application program 40, or whether the application program 40 operates independently of user interaction and makes the requests automatically during the running of the program.

When communications services are required from the server computer 20, the first application program informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class; as already described in detail above, defining the services in this way gives rise to a great number of advantages in terms of performance and reusability.

To establish the necessary communication with the server 20, the first logic means 50 determines which object class in the framework needs to be used, and then creates an instance of that object, a message being sent to that object so as to cause that object to invoke one of its methods. This gives rise to the establishment of the connection with the server computer via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110. Examples of the methods provided by the framework of object classes 120 is discussed later.

Again the available communications techniques are defined as a cohesive framework of object classes 120 derived from a single object class in order to benefit from the advantages listed earlier.

Figure 2:
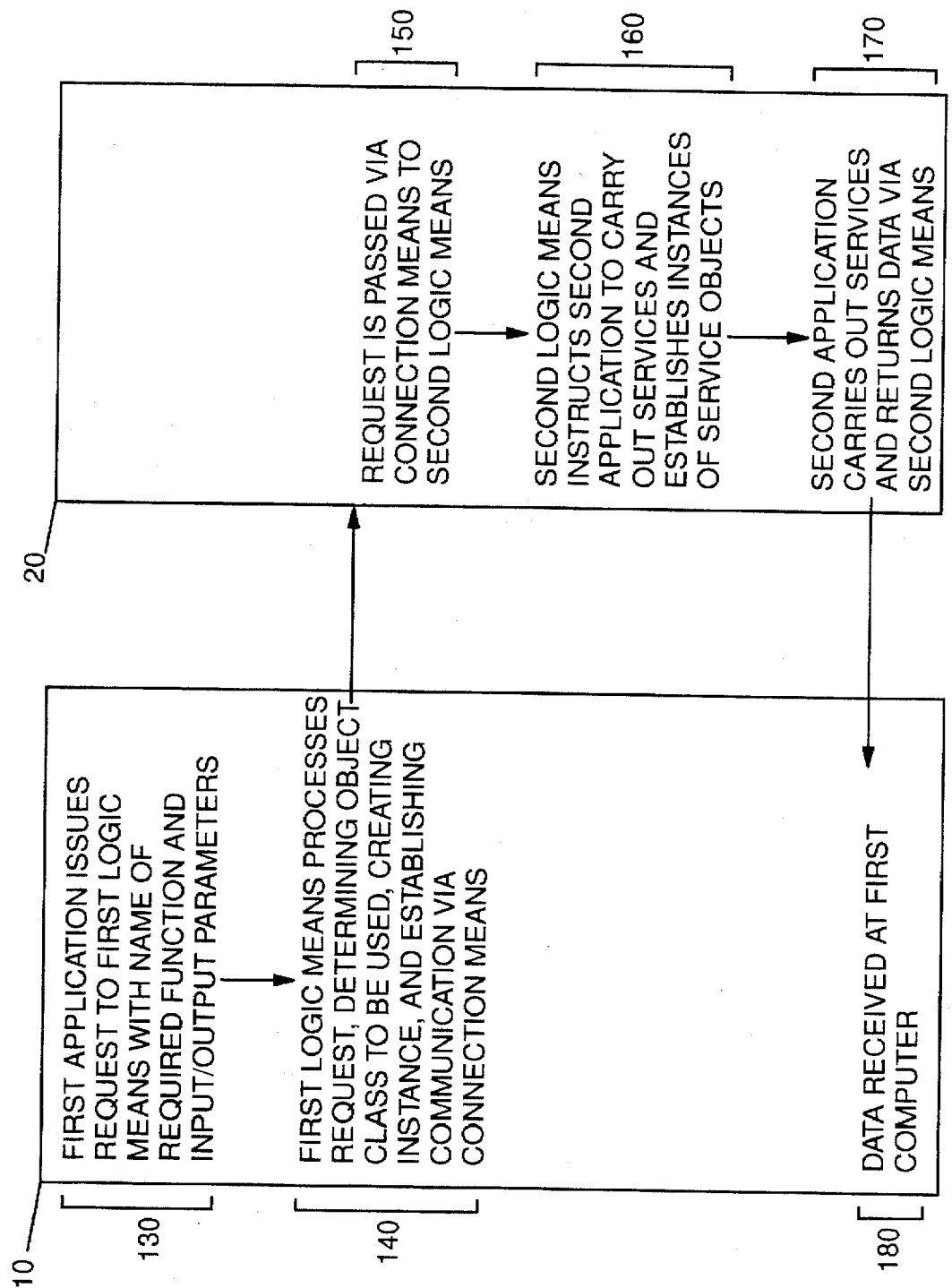
FIG. 2 shows a flowchart of the method according to the teachings of the present invention.

FIG. 2 shows a flow diagram for the method, according to the teachings of the invention, executed on client computer 10 and Server computer 20. The respective process steps are bracketed and the direction of process flow is identified by the respective arrows. In process step 130, the first application issues requests to the first logic means with name of required function and input/output parameters. In process step 140, the first logic means processes request, determining object class to be used, creating instance, and establishing communication via connection means. In step 150, the request is passed via connection means to the second logic means. In step 160, the second logic means instructs second application to carry out services and establishes instances of service objects. In step 170, the second application carries out services and returns data via second logic means. Finally, in step 180, the data is received at the first computer.

Using the above technique, the client application program 40 is not exposed to the communications architecture or communications API. Further the service application 100 is invoked through the standard mechanism for its environment; it does not know that it is being invoked remotely.

The establishment of the communications services as a cohesive framework of object classes will now be discussed. Once the idea of defining the services in this way has been derived, and it has been realised that this results in the many advantages discussed earlier, a skilled man in the art will typically be able to construct appropriate object classes. However, the following description illustrates one way in which the framework can be established.

A class needs to be defined in the storage device 60 for use by the first logic means 50 in order to implement the functions required by the client application 40. In the preferred embodiment this class will be referred to as the ClientPipe class.

The ClientPipe class encapsulates the underlying communications functions and presents a simple model for invoking a remote procedure via APPC between an OS/2 client and an MVS server.

The ClientPipe class provides a synchronous RPC environment for a calling function. The Pipe is single threaded and offers no inbuilt concurrency protection.

An object of the ClientPipe class can be instantiated to provide a basic general purpose RPC facility. However, an application specific Pipe class can be derived from the ClientPipe class to provide improved and application specific functionality.

The ClientPipe class has the following methods defined:
A. Five public methods callable by the client application 40:
  (1) a class constructor method;
  (2) a class destructor method;
  (3) a method to invoke a remote procedure at a 'partner' object, which will be discussed later;
  (4) a method to convert parameters from the client PWS format to the Server host format; and
  (5) a method to convert parameters from the Server host format to the Client PWS format.
B. Three protected methods only callable by a derived Pipe class:
  (1) a method to send data to the 'Partner' object—this represents the call part of the RPC architecture, and sends data to a named function of the Partner;
  (2) a method to receive data from the 'Partner' object—this receives data buffers from the Partner and returns these as parameters to the calling function (each parameter is encapsulated as a RemoteParm object as described later); and
  (3) a method to delete a 'ConXn' object, for example when an error is returned from the Partner (the ConXn object will also be described later).

C. Four methods which are internal to the ClientPipe class:
   (1) a method invoked when sending data to the Partner to convert all input parameters and to build the appropriate control blocks in preparation for transmission to the Partner;
   (2) a method to receive and interpret a Transaction Header sent by the partner;
   (3) a 'C' method implemented in a DLL which manages the creation of ConXn_Partner objects and 'registers' a Pipe (represented by the connection means 80 in FIG. 1) with the ConXn_Partner (the ConXn_Partner object is described later);
   (4) a 'C' method implemented in a DLL which 'deregisters' a Pipe with a ConXn_Partner and deletes the ConXn_Partner if necessary.

A corresponding class also needs to be defined in the storage device 110 for use by the second logic means 90 in order to implement the functions required by the server application 100. In the preferred embodiment this will be referred to as the ServerPipe class.

The ServerPipe class has the following methods defined:
A. Six public methods callable by the server application:
   (1) a method to handle the Control Conversation—this is invoked whenever the server application is scheduled as the result of a Control Conversation allocation;
   (2) a method to send data to the client computer 10, providing a standard subroutine mechanism—it functions in the same way as the equivalent function in the ClientPipe class, data sent by this method being received by the client by use of the receiving method of the ClientPipe class;
   (3) a method to provide dynamic dataset allocation services;
   (4) a method to perform a dynamic load and call of an external load module;
   (5) a method to allocate and/or increase an area of storage used to hold the program variables for the currently executing function; and
   (6) a method to free up or reduce the above storage area.
B. Three private methods internal to the ServerPipe class:
   (1) a method that operates as an asynchronous sub-task, and allocates a Data Conversation with the Client ConXn_Partner. It receives the data sent by the Client computer, and passes this to the Service application 100 if appropriate;
   (2) a method for allocating storage for the data sent according to information supplied by the client computer, and to call and receive the data sent by the client; and
   (3) a method to disposition Server datasets on behalf of the Client computer 10.
C. A number of user-written methods which need to be supplied by the user to complete the functionality of the service application 100:
   (1) a method which is a user written dispatcher function, and invokes the appropriate user function requested by the client application 40. This method is used to provide a standard interface into the application functions from the ServerPipe class, and is the external reference which is resolved at link time; and
   (2) methods representing one or more user functions which may need to be invoked.

The ConXn and ConXn_Partner classes referred to above will now be described. The Con_Xn class encapsulates the underlying communications to the Partner. In the preferred embodiment, it provides the interface for all communications activity. It provides APPC communications to the MVS server computer 20, but can be derived to use different communications protocols (eg TCP/IP), and/or to communicate with other platforms.

The Con_Xn class has the following methods callable by the client application program 40:
   (1) a method which 'registers' with the ConXn_Partner to obtain a Data Conversation with the Partner;
   (2) a method which 'deregisters' with the ConXn_Partner to release the Data Conversation with the Partner;
   (3) a method for sending a buffer of data to the Partner;
   (4) a method for receiving a buffer of data from the Partner;
   (5) a method to confirm to the Partner that data has been received successfully—this is only done in response to a request for confirmation from the Partner; and
   (6) a method to notify the Partner of an error—this can be done asynchronously or in response to a request for confirmation.

The ConXn_Partner class encapsulates the Partner dependent information and functions. It implements and controls the communications architecture of one Control Conversation and multiple Data Conversations. The ConXn_Partner class ties together all Con_Xns that are accessing a particular client application for a particular user ID. Preferably the ConXn_Partner class is implemented in a DLL using runtime dynamic linking, and has the following methods:
A. Five public methods callable by the client application 40:
   (1) a method invoked when the ConXn_Partner object is created—it initialises the data items and issues an APPLICATION_STARTED call;
   (2) a method invoked when the ConXn_Partner object is deleted—it issues an APPLICATION_ENDED call for the Control Conversation to terminate the APPC application;
   (3) a method which is invoked each time a Con_Xn object is created. It allocate object is created. It allocates or re-uses a Data Conversation for the Con_Xn as appropriate, and if necessary allocates the Control Conversation;
   (4) a method which is invoked each time a ConXn object is destroyed, to de-allocate or flag the Data Conversation as available, and if necessary de-allocate the Control Conversation;
   (5) a method to return the code page for the Partner.
B. A Private method internal to the ConXn_Partner class which allocates the Control Conversation with the Partner. Security checks can be carried out as part of the allocation process.

The RemoteParms mentioned earlier in the description are defined as a class which forms the abstract base class for all parameters passed to a ClientPipe object for transmission to or from a remote function. It provides the means for passing arbitrarily complex data structures. A derived RemoteParm Class is created for each specific data type, which encapsulates the data structure and thus knows how to convert its data from the client PWS format to the remote (partner) format.

A RemoteParm object contains the data in both the local and remote formats. The local data is the application data, held for example as discontiguous data items. These are the data types such as integers, character strings, and abstract data types that are meaningful to the application. Member functions are provided to 'Get' and 'Put' these data items. The remote data is held in a contiguous buffer and consists of the converted local data plus the 'scaffolding' information needed for transmission and use by the remote function. This includes data such as the Eyecatcher (identifier) and the various length fields.

The remote data buffer and functions to manipulate it are implemented in the base RemoteParm class, as these are generic. The local data items and their functions are implemented in the derived RemoteParm class.

The local data items are held as copies of the original data. Whenever local data is passed to the derived RemoteParm object, memory is allocated and the data is copied. This is because local data items 'belong' to the application. There should be no interdependency between the application and the RemoteParm object for deleting the data, or re-using the memory containing the data. The remote data buffer belongs to the RemoteParm object. It is allocated and deleted via public member functions.

The above described preferred embodiment of the present invention is much improved over the known prior communications systems for the following reasons:

1. It provides additional services beyond RPC, such as the remote file manipulation and conversational capabilities;
2. Being implemented as a cohesive framework of C++ object classes (derivable from a single class), it is easy to enhance the CSAE functionality, rather than be restricted to the API provided;
3. The CSAE is optimised to each operating environment;
4. The CSAE accepts and returns parameters, and dynamically allocates buffers for returned data; and
5. The CSAE handles all conversion of data between the two formats.

By utilising the above-described approach in the construction of a programming interface for a communications system, a programmer of a client application can readily take advantage of the above-mentioned benefits derived from this approach.

Further the communications Object Class is 'polymorphic', in that it can be viewed by different parts of the communication system as RPC, File Transfer, Send/Receive, a Data Converter, or any other communications service represented by the Communication Object Class.

By providing these communications services as an Object Class rather than API functions, derivation of functionality for specific needs is possible.

We claim:

1. A method of operating a communication system to facilitate exchange of data between a first computer (10) and a second computer connected in a network to operate in a client/server arrangement, the first computer (10) employing a different operating system to the second computer (20), and the system having a basic communications application program interface (API), the method being characterised by the steps of:

employing a first logic means (50) to process requests from a first application (40) running on the first computer (10) for connection with the second computer (20) to carry out one of a plurality of communication services;

employing a second logic means (90) to instruct a second application (100) on the second computer (20) to carry out the communications services;

returning data provided by the second application (100) via the second logic means (90) to the first computer; and storing in each computer in a storage region (60,110) accessible by the respective logic means (50, 90) a single object class for providing definitions for each of the plurality of communication services.

2. A method as claimed in claim 1, wherein a cohesive framework of object classes (70, 120) derived from the single object class is stored in each storage region (60, 110).

3. A method as claimed in claim 2, wherein the communications services defined by the framework of object classes facilitate function calling, file manipulation, and data transfer.

4. A communications system for facilitating exchange of data between a first computer (10) and a second computer (20) connected in a network to operate in a client/server arrangement, the first computer (10) employing a different operating system to the second computer (20), and the system having a basic communications application program interface (API), the system being characterised by:

first logic means (50) for processing requests from a first application (40) running on the first computer (10) for connection with the second computer (20) to carry out one of a plurality of communication services;

second logic means (90) for instructing a second application (100) on the second computer (20) to carry out the communications services and for returning data provided by the second application (100) to the first computer (10); and a storage device (60, 110) on each computer accessible by the respective logic means (50, 90), each storage device storing a single object class for providing definitions for each of the plurality of communication services.

5. A system as claimed in claim 4, wherein each storage device (60, 110) stores a cohesive framework of object classes (70, 120) derived from the single object class.

6. A system as claimed in claim 5, wherein the communications services defined by the framework of object classes facilitate function calling, file manipulation, and data transfer.

7. A system as claimed in any of claims 4 to 6, wherein the operating system employed by the first computer is the IBM OS/2 operating system.

8. A system as claimed in claim 7, wherein the operating system employed by the second computer is the IBM MVS operating system.

9. A system as claimed in any preceding claim, wherein the basic communications API is APPC.

10. A device for use in a communications networking including at least two computers comprising:

a storage storing a plurality of object classes being derived from a single object class with each of the plurality of object classes providing definition for each of a plurality of services; and logic means, operatively coupled to the storage, for accessing the object classes and selecting an object class associated with a particular service.

11. The device of claim 10 wherein the object classes relates to communications services.

* * * * *